(12) United States Patent
Kane

(10) Patent No.: US 8,092,849 B2
(45) Date of Patent: Jan. 10, 2012

(54) BAKING MOULD

(76) Inventor: Rose Kane, Glengormley (GB)

( * ) Notice: Subject to any disclaimer, the term of this patent is extended or adjusted under 35 U.S.C. 154(b) by 434 days.

(21) Appl. No.: 12/091,611

(22) PCT Filed: Oct. 24, 2006

(86) PCT No.: PCT/GB2006/003972
§ 371 (c)(1),
(2), (4) Date: Apr. 25, 2008

(87) PCT Pub. No.: WO2007/049037
PCT Pub. Date: May 3, 2007

(65) Prior Publication Data
US 2008/0274253 A1 Nov. 6, 2008

(30) Foreign Application Priority Data
Oct. 25, 2005 (GB) .................................. 0521683.3

(51) Int. Cl.
*A21D 8/00* (2006.01)
(52) U.S. Cl. ........ 426/280; 426/283; 426/284; 426/496; 426/505; 426/523
(58) Field of Classification Search .................. 426/496, 426/505, 512, 523, 104, 89, 279, 280, 282–284, 426/94; 99/353, 426; 425/123; 220/573.1–573.4; 249/144, 151
See application file for complete search history.

(56) References Cited

U.S. PATENT DOCUMENTS

| | | | | |
|---|---|---|---|---|
| 1,487,906 | A * | 3/1924 | White et al. | 99/439 |
| 1,690,882 | A * | 11/1928 | Wear | 426/391 |
| 1,801,160 | A * | 4/1931 | Ingoglia | 426/496 |
| 1,812,769 | A * | 6/1931 | Binger | 426/27 |
| 1,852,966 | A * | 4/1932 | Green | 99/439 |
| 2,028,671 | A * | 1/1936 | Kollman | 220/506 |
| 2,529,354 | A * | 11/1950 | Schroeder | 220/506 |
| 2,635,349 | A * | 4/1953 | Green | 33/312 |
| 2,708,889 | A * | 5/1955 | Nafziger | 249/121 |
| 2,746,402 | A * | 5/1956 | Baxter | 249/63 |
| 2,874,649 | A * | 2/1959 | Pelletier | 426/249 |
| 2,937,095 | A * | 5/1960 | Zitin | 426/92 |
| 3,060,494 | A | 10/1962 | Noble | |
| 3,255,017 | A * | 6/1966 | Leaver | 426/124 |
| 3,473,489 | A * | 10/1969 | Sargent | 426/275 |
| 3,689,280 | A * | 9/1972 | Ingoglia | 426/249 |
| 4,052,034 | A * | 10/1977 | Marceno | 249/110 |
| 4,212,234 | A * | 7/1980 | DeCourcy | 99/426 |

(Continued)

FOREIGN PATENT DOCUMENTS

EP     0 961 549     12/1999

(Continued)

OTHER PUBLICATIONS

International Search Report issued in corresponding International application No. PCT/GB2006/003972 issued Jan. 16, 2007.

*Primary Examiner* — Drew E Becker
(74) *Attorney, Agent, or Firm* — Lempia Summerfield Katz LLC

(57) ABSTRACT

A baking apparatus or tin, particularly for baking bread, comprising an outer housing able to accommodate a first dough, and one or more insertable, separable sleeves able to accommodate at least a second dough.

5 Claims, 8 Drawing Sheets

U.S. PATENT DOCUMENTS

| | | | | |
|---|---|---|---|---|
| 4,395,015 A * | 7/1983 | Reardon | | 249/115 |
| 4,452,419 A * | 6/1984 | Saleeba | | 249/53 R |
| 4,664,928 A * | 5/1987 | McCaffrey | | 426/503 |
| 5,508,049 A * | 4/1996 | Kordic | | 426/94 |
| 5,518,746 A * | 5/1996 | Diaz | | 426/282 |
| 5,614,240 A * | 3/1997 | Young | | 426/505 |
| 5,948,313 A | 9/1999 | Cahen | | |
| 6,200,620 B1 * | 3/2001 | Brinker | | 426/389 |
| 6,231,910 B1 * | 5/2001 | Ellingsworth | | 426/505 |
| D486,035 S * | 2/2004 | Morgan | | D7/354 |
| 6,783,782 B1 * | 8/2004 | Larsen et al. | | 426/76 |
| 2004/0076725 A1 * | 4/2004 | Hayashi et al. | | 426/503 |
| 2005/0263012 A1 * | 12/2005 | Weld et al. | | 99/426 |
| 2006/0141100 A1 * | 6/2006 | Dimitrov et al. | | 426/94 |
| 2006/0175527 A1 * | 8/2006 | Morgan | | 249/139 |

FOREIGN PATENT DOCUMENTS

| | | |
|---|---|---|
| JP | 3123437 | 5/1991 |
| JP | 8256668 | 10/1996 |
| JP | 9028274 | 2/1997 |
| JP | 2000300152 | 10/2000 |
| JP | 2001045962 | 2/2001 |
| WO | WO 92/11765 | 7/1992 |
| WO | WO 02/058473 | 8/2002 |
| WO | WO 2005/011388 | 2/2005 |

* cited by examiner ection view of the baking apparatus in
BAKING MOULD

Related Application Data

This application is the national phase of International Application No. PCT/GB2006/003972, which was filed on Oct. 24, 2006, and which, in turn, claimed the benefit of Great Britain Application No. 0521683.3, which was filed on Oct. 25, 2005, the entire disclosures of which are hereby incorporated by reference.

The present invention relates to baking apparatus. In particular, the invention relates to an apparatus for baking bread.

BACKGROUND OF THE INVENTION.

Conventional bread making involves baking one type of dough within a single mould. Devices have been provided that allow more than one type of dough to be baked in a single mould. It would be useful however, if a device could be provided that allows one type of dough to be baked within another type of dough. This invention provides an apparatus that allows this.

SUMMARY OF THE INVENTION.

A first aspect of the present invention provides a baking apparatus or tin, particularly for baking bread, comprising an outer housing able to accommodate a first dough, and one or more insertable, separable sleeves able to accommodate at least a second dough.

The outer housing of the baking apparatus may have any shape and dimensions. This could be shaped in a particular style, or "regular", similar to a conventional baking tin for baking bread. Indeed, the outer housing may also have any regular or non-regular cross sectional shape along its length. Preferably the outer housing is elongate and more preferably, there is an open mouth located at the side (or end) section, most preferably a side (or end) section perpendicular to the longitudinal axis of the outer housing.

Preferably, the open mouth may be closed with a wall or lid. The lid may be separate or integral with the outer housing, for example, it may be slidably attachable to the outer housing or may have a hinged attachment to the outer housing for moving the lid from an open position to a closed position.

The or each sleeve is effectively an "inner housing" for a second dough. The sleeve may have any shape or dimensions as long as it can be positioned within the outer housing. The longitudinal axis of the sleeve and outer housing are preferably substantially coincident or parallel with one another, so as to define an outer compartment between the outer housing and sleeve, and an inner compartment along its length within the sleeve. The sleeve may be any regular or non-regular cross sectional shape and have at least an open second mouth. It may also be open at both ends.

Preferably the or each sleeve is elongate. The sleeve may also be an irregular shape and may be tapered or funneled preferably at one end to facilitate insertion of a dough.

Optionally, two or more similar or differently shaped (e.g. having differently shaped transverse cross-sections) sleeves may be located within the outer housing to produce inner compartments of different shapes. A sleeve may be used in conjunction with another sleeve so as to produce a specific combined shape such a letter e.g. the letter "i".

Preferably the or each sleeve is positioned within the outer housing by cooperation of locating means on the sleeve and corresponding locating means on or in the outer housing. The locating means includes any suitable male and female co-operating features such as one or more male tabs and corresponding female slots. A female slot may be a recess or aperture. The female (or male) locating means may be provided on the wall of the outer housing, opposite the open first mouth and the corresponding male (or female) locating means may be provided on the or each sleeve.

The or each sleeve may be provided with at least one handle to assist use, location or removal. On example is a handle that projects adjacent to the open mouth of the outer housing.

The apparatus may additionally comprise one or more sleeve inserts, locatable, in use, within a sleeve. An insert may be solid or hollow. The insert should be tight fitting with a sleeve. The insert can be used to push dough into a sleeve. The insert may also be provided with at least one handle at one end. The insert may also be used to keep a dough in place, for example to hold the second dough in place when removing the sleeve around it after part-rising.

Each of the first, second and any further doughs may be yeast based or may incorporate other rising agents e.g. Bicarbonate of Soda.

In one embodiment of the present invention, the invention may be used to bake a loaf of bread with a central section of bread that may be different from the surrounding bread. The central section of bread may form a recognisable shape when the bread is cut in a transverse cross section. The first, second and any further doughs may be differentiated for example by using different colours of doughs, different tastes or textures, or different or added ingredients in the dough, for example fruit or other pieces in one dough but not in the other.

Optionally the outer housing may be used without the sleeve.

A second aspect of the invention provides a method of baking a dough-based product using an apparatus of the first aspect of the invention, the method comprising at least the steps of; a) filling a first dough into the outer housing and a second dough into a sleeve, inserting the sleeve into the outer housing, the said three actions being carried out in any order, b) allowing the first and second doughs to prove separately, c) removing the sleeve from the outer housing and d) baking the first and second doughs together to provide the baked product.

Preferably, the order of step (a) is: the sleeve is inserted into the outer housing, the sleeve then is filled with a second dough and the outer housing is then filled with a first dough.

A sleeve may be used in conjunction with a non stick spray e.g. silicon spray. Non-stick sprays can be sprayed on the interior and exterior of a sleeve to prevent any dough from adhering to the sides of the sleeve whilst removing the sleeve from the outer housing before baking the dough. Non-stick sprays such as silicon sprays are known in the art.

BRIEF DESCRIPTION OF THE DRAWINGS.

Embodiments of the present invention are now described by way of example only and with reference to the accompanying drawings in which like numerals are used to indicate like parts and in which.

DETAILED DESCRIPTION OF THE DRAWINGS.

Figure 8:
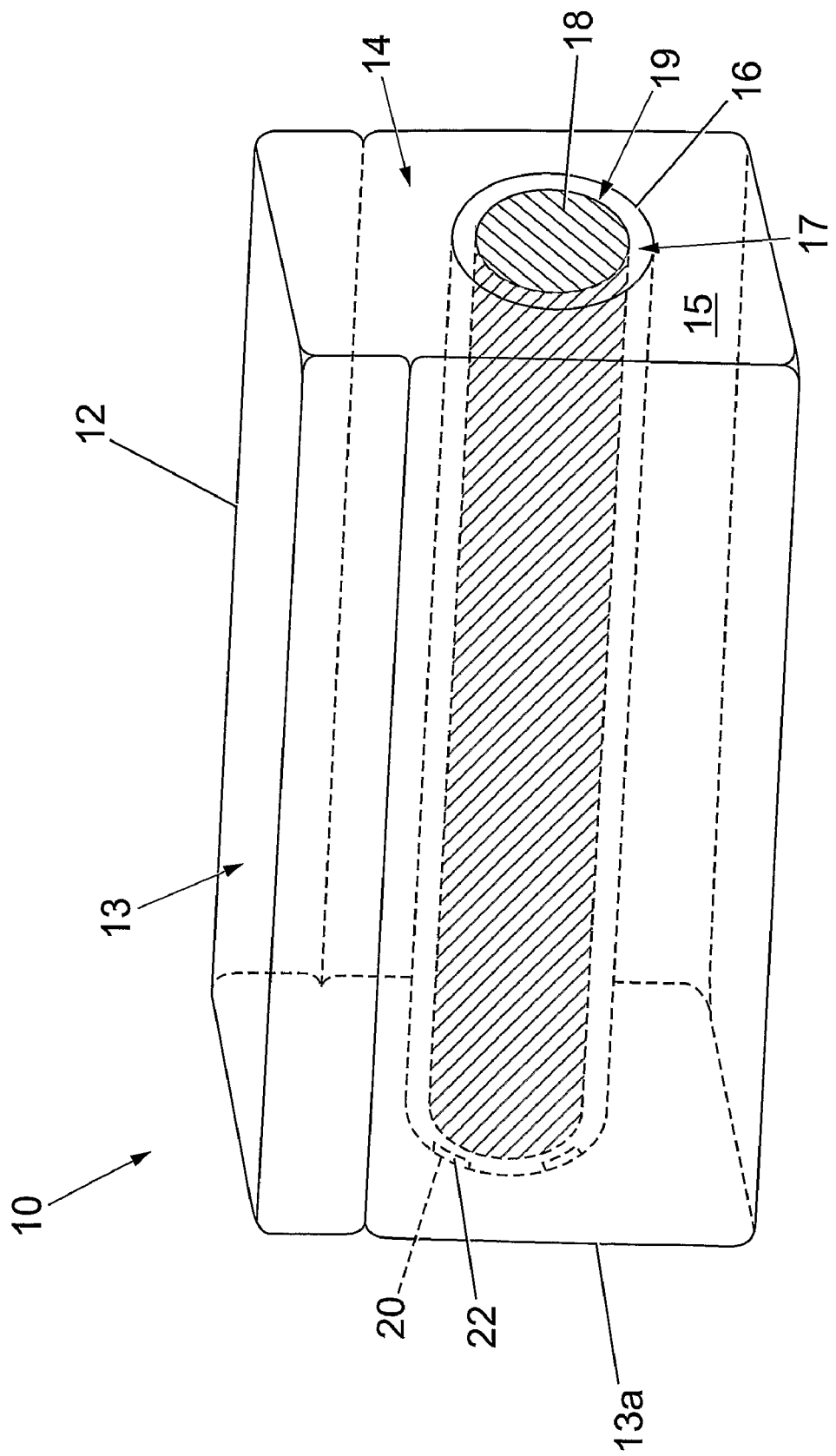
FIG. 8 shows a perspective view of a baking apparatus according to another embodiment of the present invention.

Referring firstly to FIG. 8 of the drawings, there is shown one embodiment of the present invention, generally indicated as 10, being an apparatus for baking bread. The bread making apparatus 10 comprises an outer housing 12 having an open first mouth 14; an inner housing or sleeve 16 having an open second mouth 19 and a further insert 18. The open first mouth 14 is located at a side or end section, of the outer housing 12, when compared to a conventional baking tin. In FIG. 8 the outer housing 12, in one possible embodiment of the invention, is shaped to mimic a baked risen loaf.

The sleeve 16 may be positioned inside the outer housing 12 along the longitudinal axis. The sleeve 16 forms an inner compartment 17 while leaving an outer compartment 15 between the walls 13 of the outer housing 12 and the walls of the sleeve 16. The sleeve 16 may be dimensioned to form different cross sectional shapes of inner compartment 17 as shown in FIG. 8.

The sleeve 16 may be located within the outer housing 12 by male locating tabs 20 on the sleeve 16 and female receiving slots 22.

Figure 1:
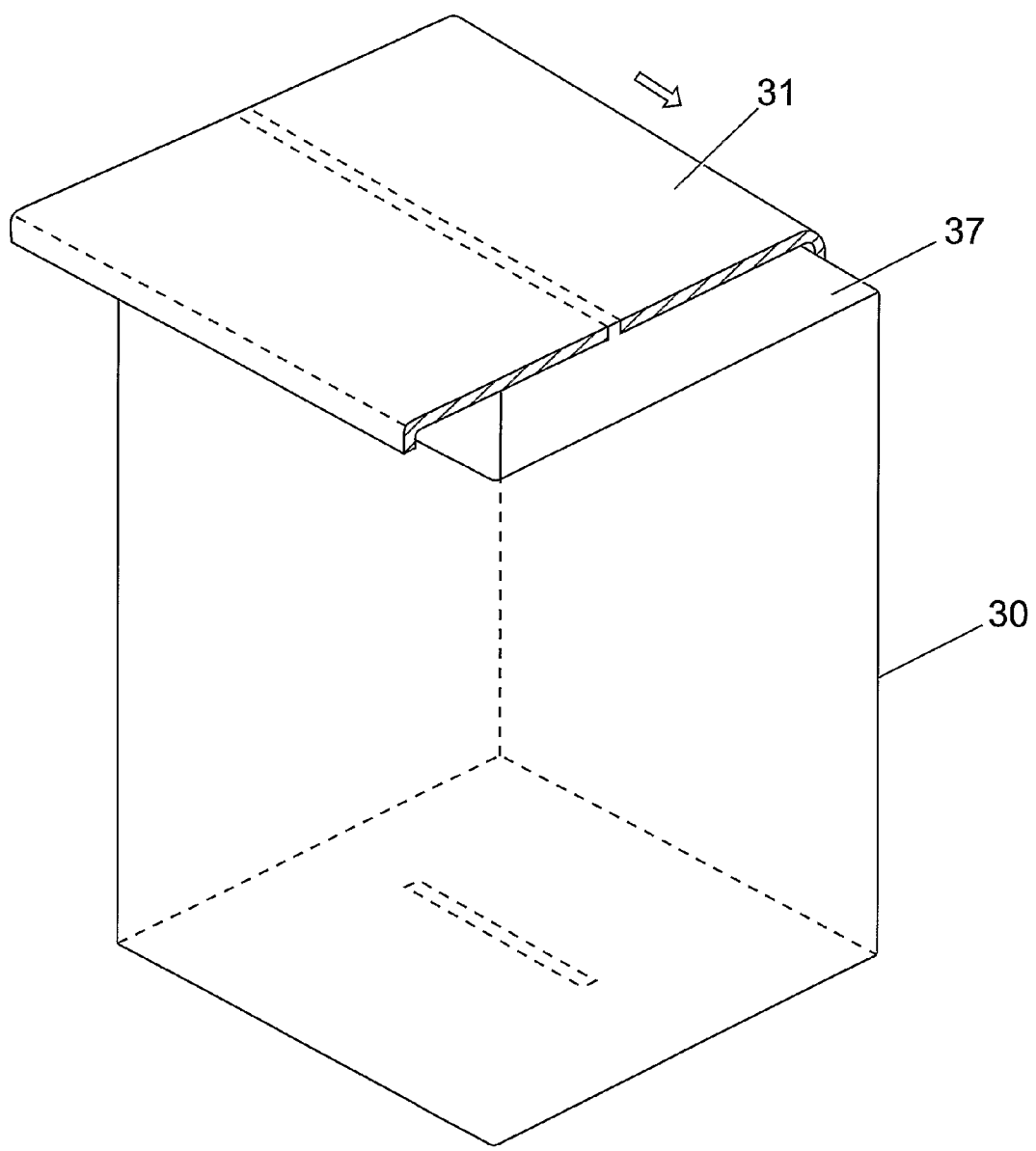
FIG. 1 shows a perspective view of an outer housing with a slidable lid usable with the present invention.
Figure 2:
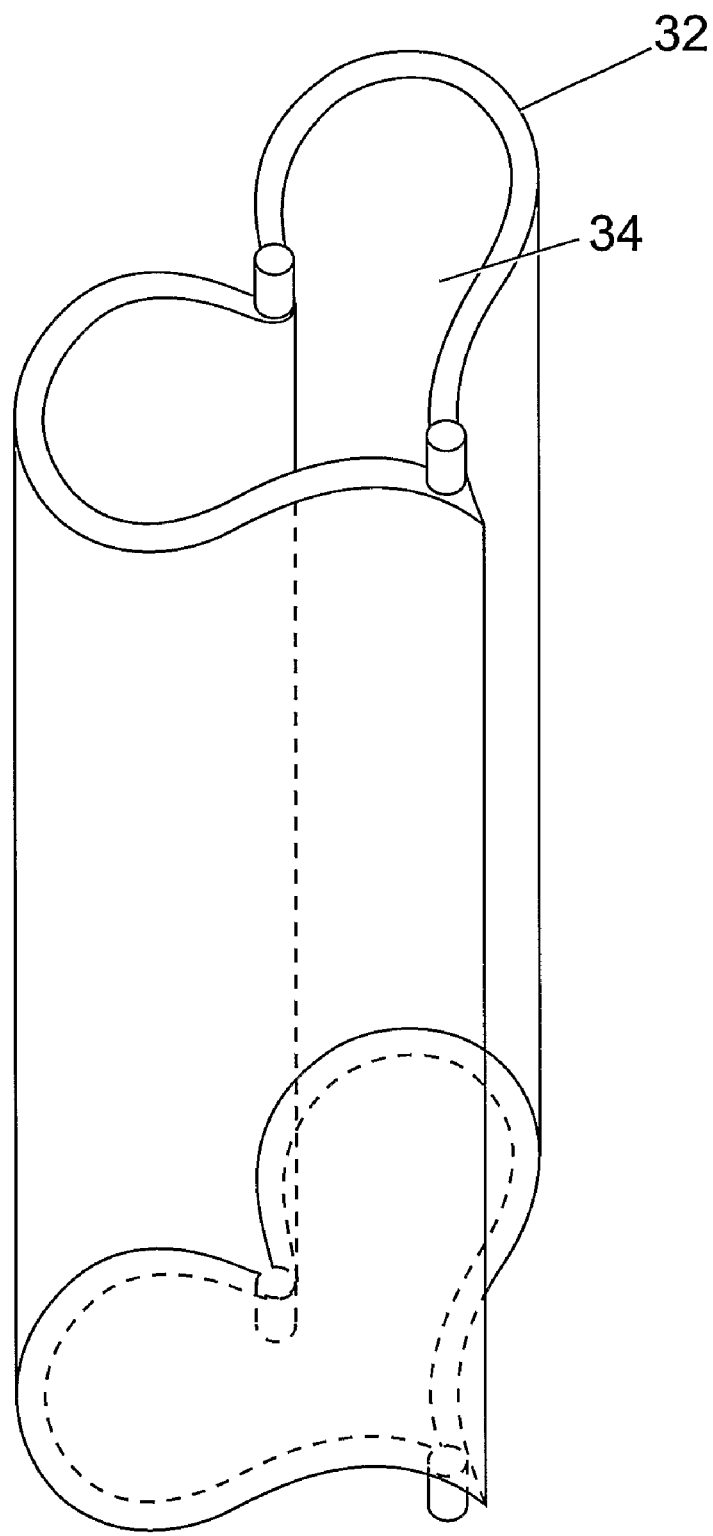
FIG. 2 shows a perspective view of a sleeve.
Figure 3:
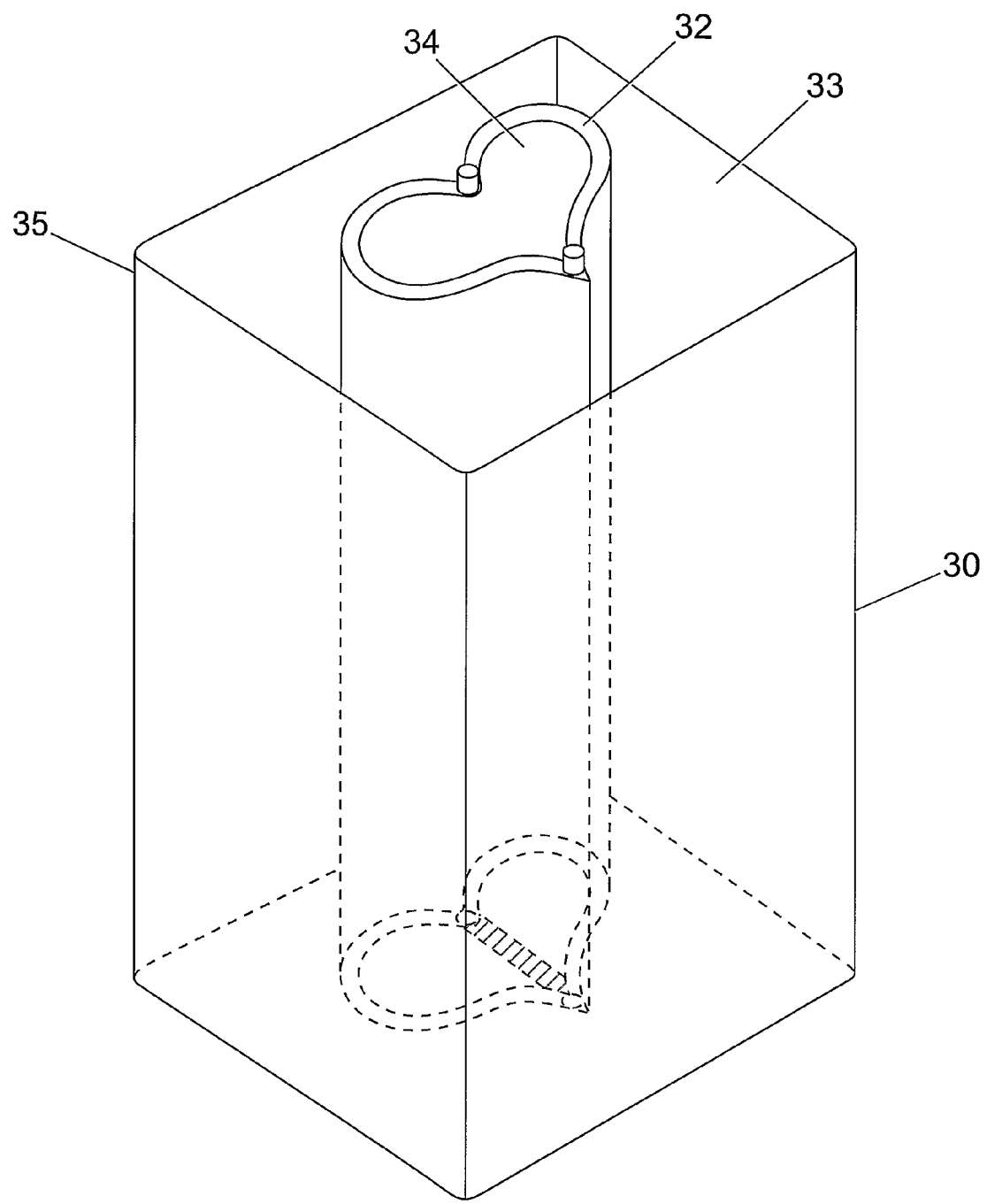
FIG. 3 shows a perspective view of the sleeve of FIG. 2 inside the outer housing of FIG. 1.

FIG. 1 shows a second outer housing 30 according to another embodiment of the present invention. The outer housing 30 has an open mouth 37 at one end which can be covered by a slidable lid 31. FIG. 2 shows a sleeve 32 in the shape of a "heart" with an inner compartment 34. The sleeve 32 is positioned within the outer housing 30 as shown is FIG. 3.

Figure 4:
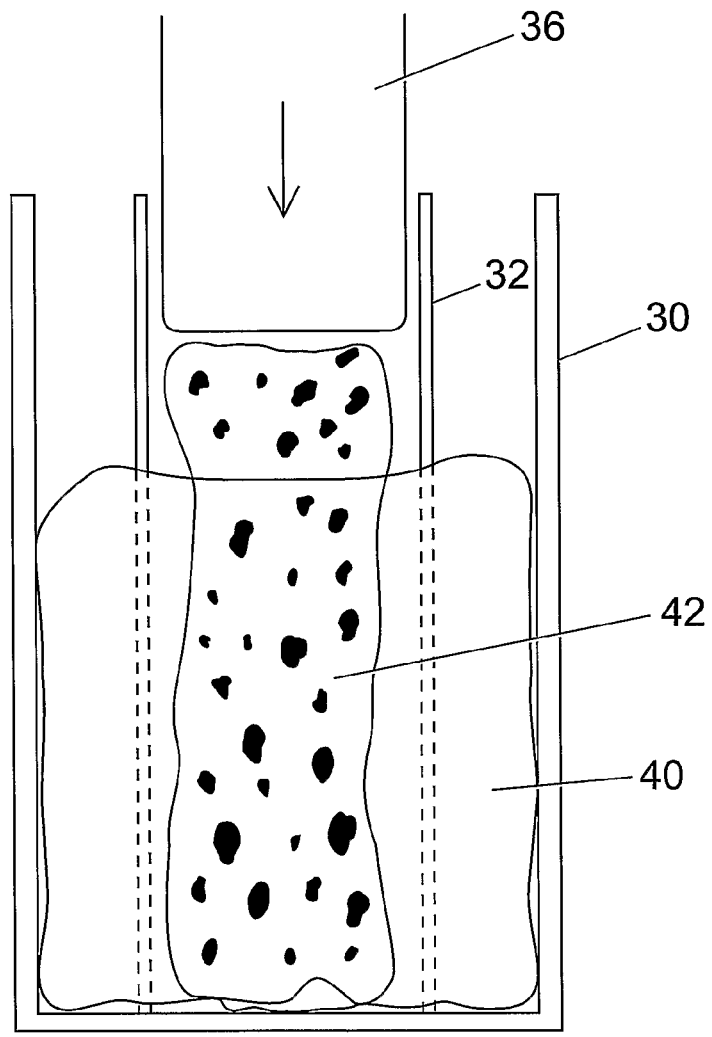
FIG. 4 shows a side section view of the baking apparatus in operation illustrating the insertion of dough into the sleeve prior to proving.
Figure 4A:
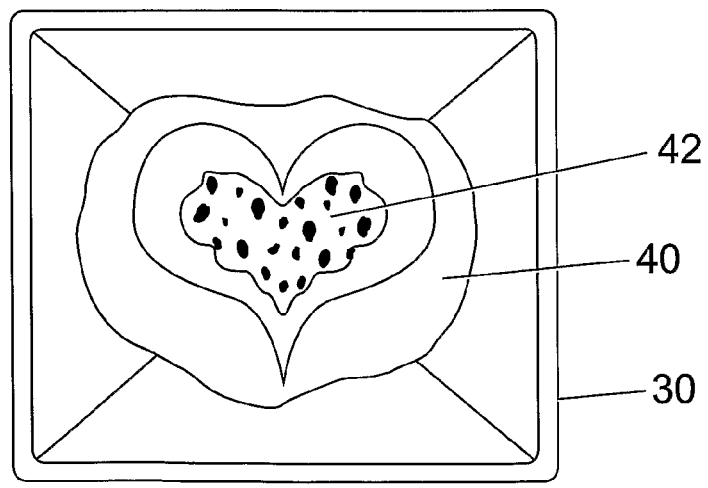
FIG. 4a is an aerial view of FIG. 4 after the dough has been inserted into the sleeve.

By way of example, FIGS. 4 and 4a show a first dough 40 and a second dough 42 prepared using the ingredients as shown in Table 1 wherein the first dough is white and the second dough is red. FIG. 4 illustrates the insertion of the second dough into the sleeve 32 prior to proving.

TABLE 1

Ingredients for Dough Mixtures

| White Dough | Red Dough |
| --- | --- |
| 400 g strong bread flour | 200 g strong bread flour |
| 8 g salt | 4 g salt |
| 4 g fat (vegetable oil) | 2 g fat (vegetable oil) |
| 240 ml liquid (1 part boiling, 2 parts cold water) | 140 ml liquid (75 g beetroot puree made up to 140 ml volume with water at 1 part boiling, 2 parts cold water) |
| 8 g yeast; fast action yeast | |
| 2 g Bicarbonate of Soda | |
| | 4 g yeast; fast action yeast |
| | 1 g Bicarbonate of Soda |

Both the white and red doughs were kneaded for ten minutes before use in the baking apparatus.

Referring to FIGS. 2, 3, 4 & 4a, when the sleeve 32 is located within the outer housing 30, the white dough 40 is introduced into the outer compartment 33 and the red dough 42 is introduced into the inner compartment 34 of the bread making apparatus 35. A sleeve insert 36 may be used to help push the red dough 42 into the inner compartment 34, by being inserted into the sleeve 32, as shown in FIGS. 4 & 4a. Once the respective compartments are full, the doughs 40, 42 are left to prove for one hour in a proving oven at 32° C., with the sleeve 32 in position and the lid 31 in a closed position over the open mouth 37 of the outer housing 30. The sleeve 32 separates the red dough 42 of the inner compartment 34 from the white dough 40 of the outer compartment 33 during this proving. The red dough 40 in the sleeve 32 will take the shape of the inner compartment 34. The dough in the inner compartment 34 may be of any different type to the dough in the outer compartment 33, for example, a different colour, taste or texture.

Figure 5:
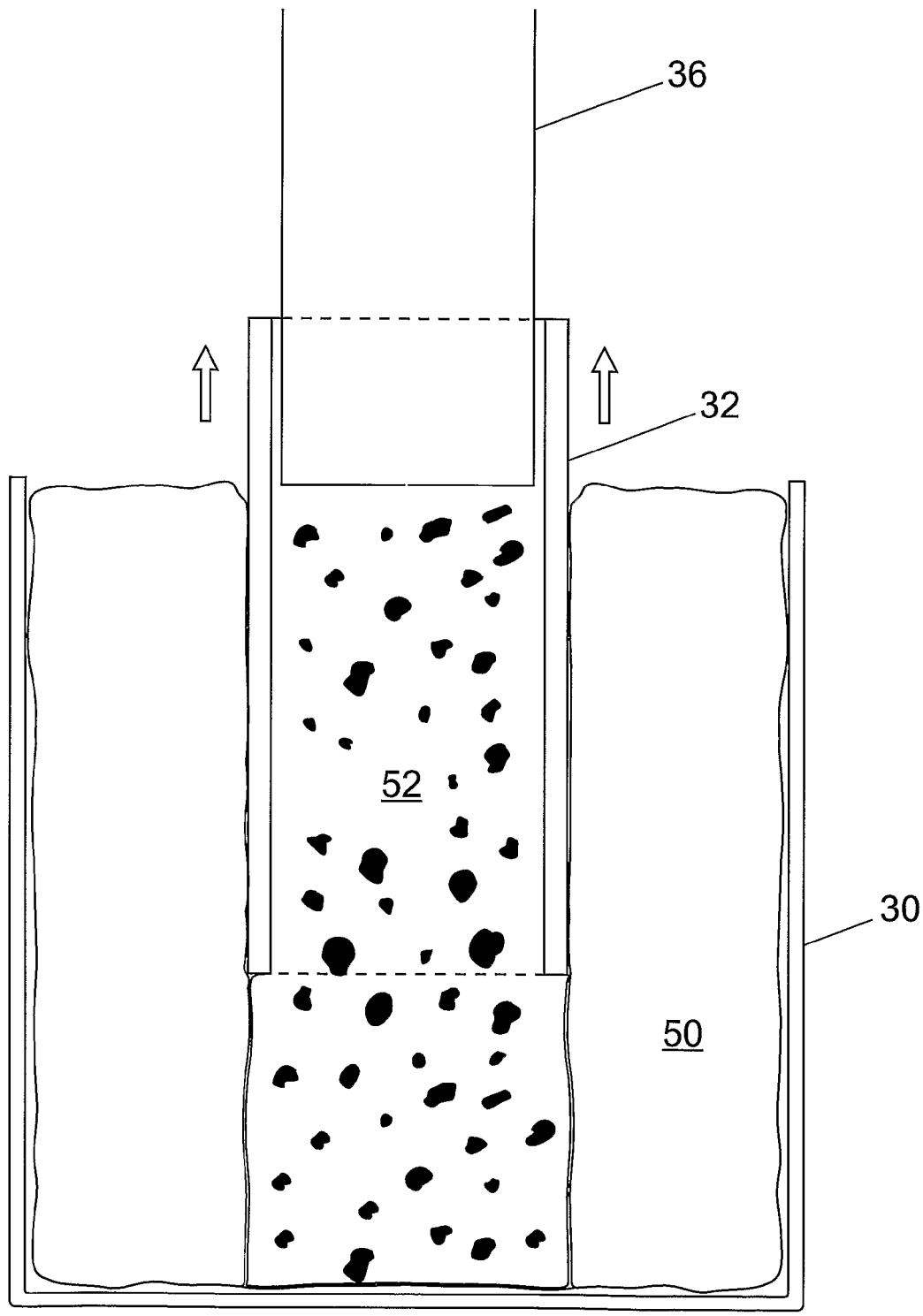
FIG. 5 shows a side section view of the baking apparatus in operation showing the removal of the inner sleeve using an insert.
Figure 6:
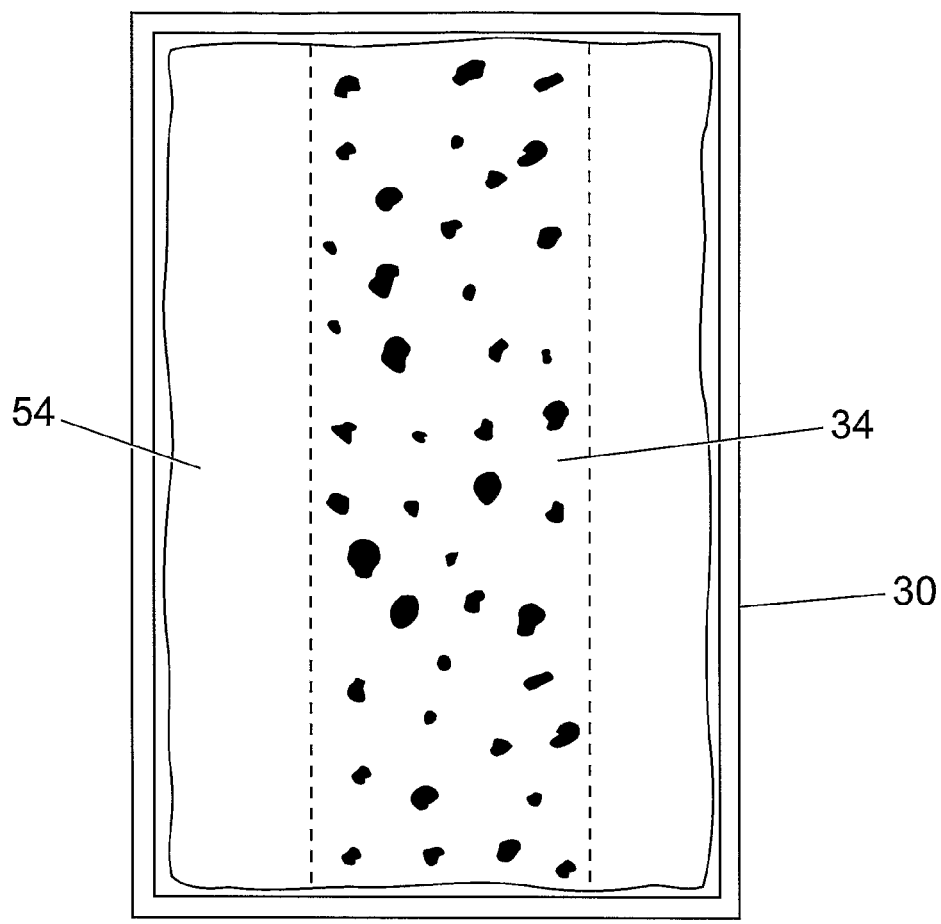
FIGS. 6 and 6a show cross sectional views of the baked bread inside the outer housing.
Figure 6A:
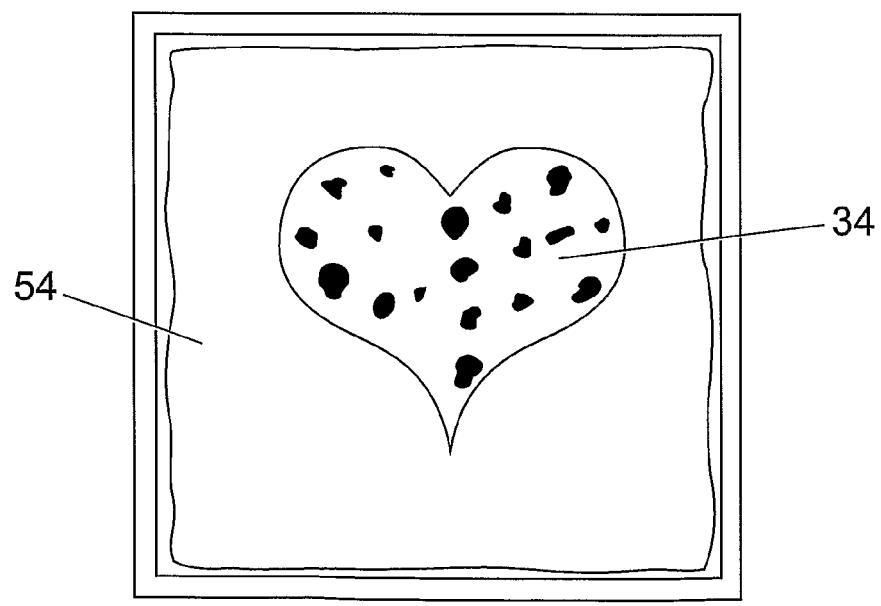
Figure 7:
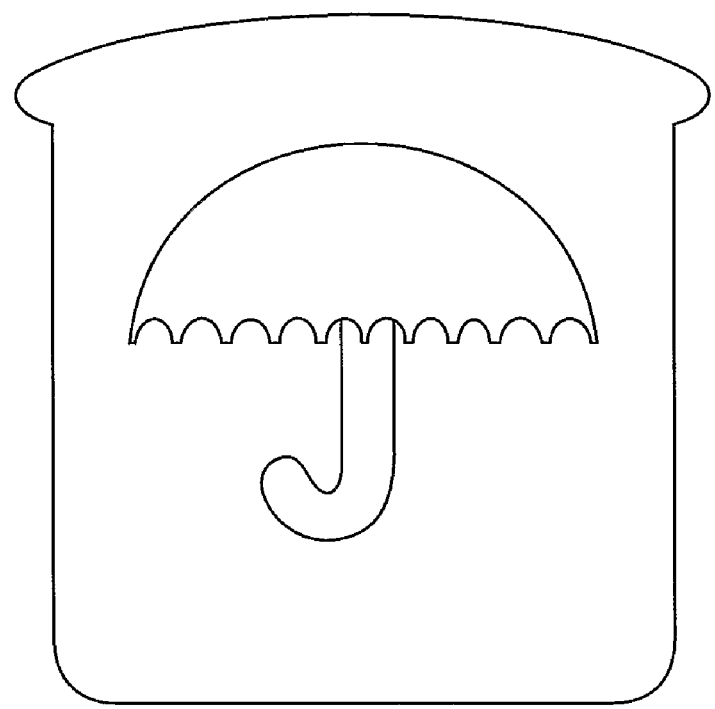
FIGS. 7 and 7a show cross sections of two possible compartment shapes by way of example only.
Figure 7A:
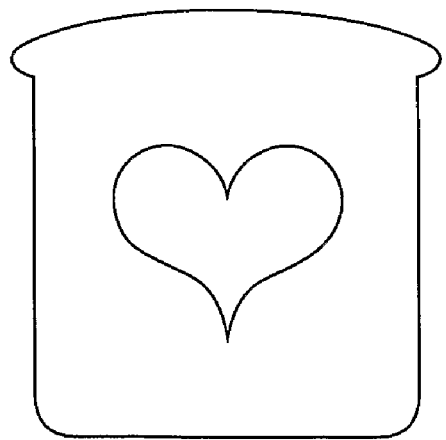

Once the doughs 40, 42 have proved, the sleeve 32 is removed from the bread making apparatus 35, using the insert 36 to keep the part-risen second or red dough 52 in place when removing the sleeve 32 as shown in FIG. 5. The part-risen white and red doughs 50, 52 respectively are then baked in a conventional manner within the outer housing 30 at 200° C. for 30 minutes, during which they may become integral with each other, to form the bread loaf 54. The second or red dough 52 that had proved in the inner compartment 34 is baked to form the shape of the sleeve 32 as shown in FIG. 6. Thus when the bread loaf is removed from the outer housing 30 and cut, a transverse cross sectional slice will show the cross sectional shape of the inner compartment 34 as shown in FIG. 6a. Differently shaped sleeves, may be inserted into the same outer housing 30 to produce breads with different cross sectional shapes as illustrated in FIGS. 7 and 7a.

The present invention is not limited to the embodiment(s) described herein, which may be amended or modified without departing from the scope of the present invention.

The invention claimed is:

1. A method of baking a dough-based product, comprising the steps of:
    a) providing a baking apparatus comprising an outer housing and at least one insertable, separable sleeve, wherein the outer housing and the at least one sleeve are elongate;
    b) filling a first dough into the outer housing, filling a second dough into the at least one sleeve and inserting the at least one sleeve into the outer housing, wherein the first dough filling, the second dough filling, and the at least one sleeve inserting are carried out in any order;
    c) allowing the first and second doughs to prove whilst separated by the at least one sleeve;
    d) removing the at least one sleeve from the outer housing after step (c) using a tight fitting insert to keep the second proven dough in place with the first dough; and
    e) after steps (a) to (d), baking the first and second doughs together to provide the baked product.

2. A method as claimed in claim 1 wherein step (b) comprises:
    inserting the at least one sleeve into the outer housing before filling the outer housing with the first dough and the at least one sleeve with the second dough.

3. A method as claimed in claim 1 wherein the at least one sleeve is positioned within the outer housing by cooperation of locating means on the at least one sleeve and corresponding locating means on or in the outer housing.

4. A method as claimed in claim 1, further comprising using the insert to assist filling the second dough into the at least one sleeve.

5. A method as claimed in claim 1 wherein the first dough has a different colour, texture and/or taste from the second dough.

* * * * *